June 25, 1957 G. A. JOHNSON 2,796,819
ROTARY HOE WHEEL
Filed Feb. 1, 1955

INVENTOR.
GUSTAVE ARVID JOHNSON
BY
Paul O. Pippel
ATTORNEY

United States Patent Office 2,796,819
Patented June 25, 1957

2,796,819

ROTARY HOE WHEEL

Gustave Arvid Johnson, Riverside, Ill., assignor to International Harvester Company, a corporation of New Jersey Application February 1, 1955, Serial No. 485,440

5 Claims. (Cl. 97—212)

This invention relates to rotary hoes and more particularly to a novel fabricated rotary hoe.

A general object of the invention is to provide a novel rotary hoe wheel of simplified construction and which is economical to manufacture and yet possesses the requisite ruggedness and efficiency for difficult field operation.

A more specific object of the invention is to provide a hoe wheel of the type described which incorporates a cast iron hub incorporating a cylindrical peripheral tooth holder or rim with a radially stepped shoulder, the rim being perforated with a series of equally spaced radial openings therethrough each of which receives the root end of a tooth and the root ends being upset against the internal and external sides of the rim to provide confronting clamping flanges and the outer flange being upset to conform to the shoulder contour to hold the tooth from rotating.

A still further object of the invention is to so locate the interlocking shoulder of the rim in an area where it has a strong connection to the spacer flange which interconnects it with the hub.

These and other objects of the invention will become more apparent from the specification and the drawings, wherein.

Figure 3:
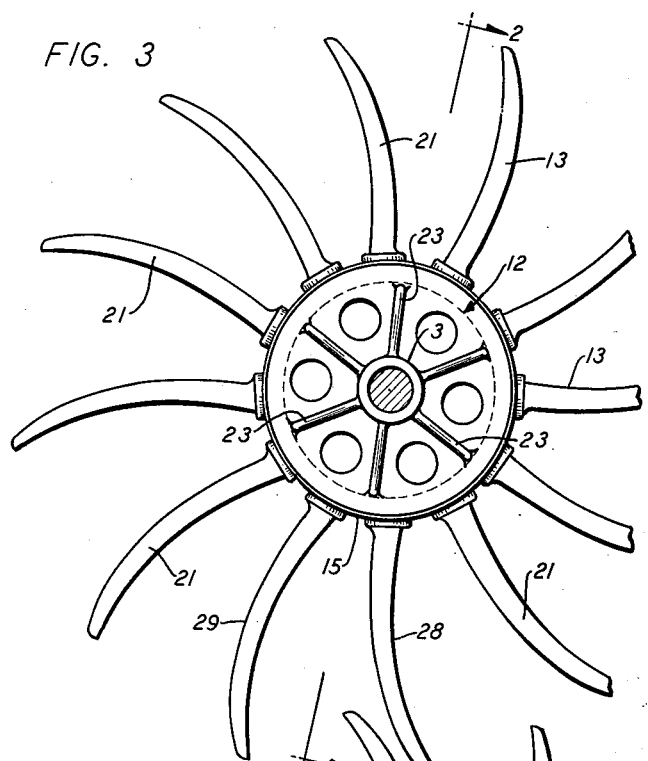
Figure 3 is a fragmentary side elevational view of the opposite side of the hoe as respects to that shown in Figure 1.
Figure 2:
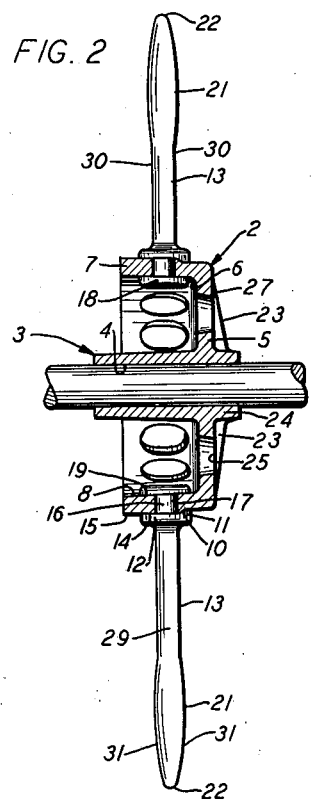
Figure 2 is a radial sectional view taken substantially on the line 2—2 of Figure 1.
Figure 1:
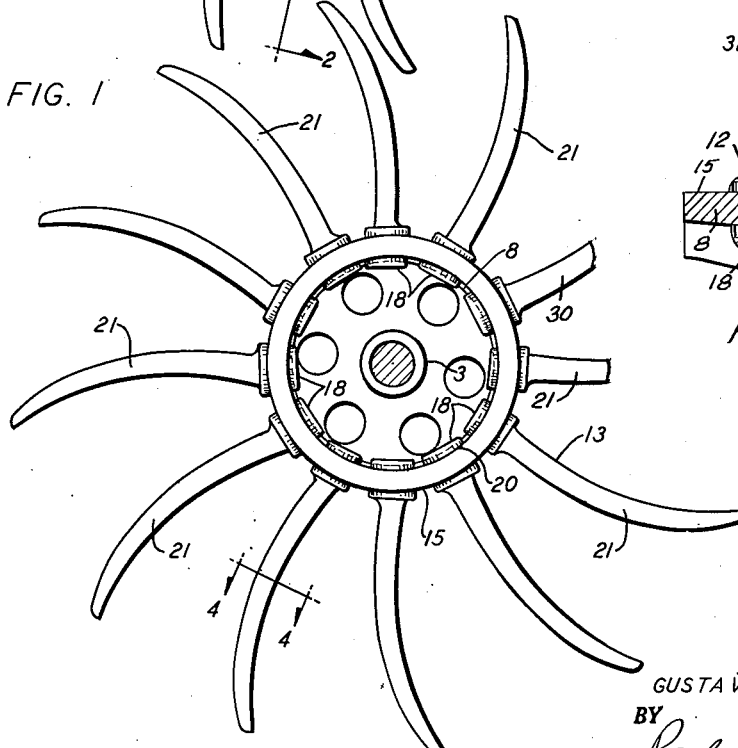
Figure 1 is a fragmentary elevational view of one side of the rotary hoe.
Figure 5:
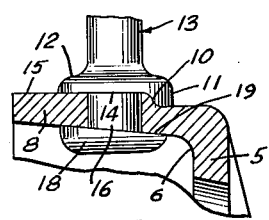
Figure 5 is an enlarged sectional detail view of the tooth to rim interlocking means.
Figure 4:
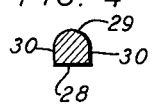
Figure 4 is a cross-sectional view on the line 4—4 of Figure 1 of one of the teeth or spokes of the hoe.

Describing the invention in detail, the core or support structure generally designated 2 comprises a central hub 3 with an axial receiving bore 4, the hub 3 being of generally tubular construction and intermediate its ends is provided with an integral radial disk-like flange 5. The outer portion of the disk 5 is formed integral with an inner edge 6 of an axially directed generally cylindrical rim-like tooth holder or ring 7 which is concentric with the hub 3 and has an inner periphery 8 of generally frusto conical confirmation which apexes in the direction toward the circular plate 5 from one side of which extends the rim 7.

The rim 7 adjacent to its inner edge 6 is of reduced thickness and is formed to provide a radial shoulder 10 against which snugly seats an inwardly depressed interlocking portion 11 of an associated tooth or spike 13, the portion 11 being formed as an integral part of an outer flange 12 which extends circumferentially and diametrically opposite the portion 11 and has cylindrical face engagement on its inner side as at 14 against the complementary external periphery 15 of the remainder of the ring 7. It will be noted that the embossment 12 is formed at the outer end of the root portion 16 of each tooth 13, said root portion 16 being substantially cylindrical in shape and extending through a complementary aperture or opening 17 in the ring 7 and at its inner extremity being deformed to provide a rivet head or flange 18 which has an inner face 19 opposing the face 8 of the interior of the ring 7 and in tight engagement therewith. Thus it will be observed that the engagement between the faces 19 and 8 is at an obtuse angle to the longitudinal axis of the related tooth 13 and this relationship together with the interlock of the offset portion 11 with the shoulder 10 contributes to retaining the tooth in preset fixed relation with the carrier 2.

It will further be observed that the shouldered interlock is formed at the inner edge portion 6 of the ring 7 in its strongest area where it is connected to the plate 5.

It will be noticed that the head 18 of the inner root end of each tooth has cylindrical face engagement at 20 circumferentially of the rim 7 and this further contributes to the interlock.

Each tooth extends radially outwardly of the carrier 2 and has an outer portion 21 which is curved circumferentially of the carrier into the direction of rotation and tapered radially outwardly to a pointed outer end 22. The tooth has a concave forward side 28 and a convex rear side 29 and flat lateral sides 30 and the outer end portion 21 is flattened and widened to provide outwardly bowed lateral edges 31 which widen the tooth end portion 21 intermediate its ends for efficient spading action.

The plate portions connection to the hub 3 is rigidified by a series of radially extending ribs 23 which at their radially inner ends 24 are integrally united with the hub 3 and along an adjacent edge 25 are integrated with the outer face 27 of the plate 5. The ribs 23 taper radially outwardly and vanish adjacent to the outer periphery of the plate 5.

I claim:

1. A fabricated rotary hoe comprising a core member including a hub with an axle bore therethrough, a radial disc integral with said hub, an integral rim about the outer periphery of said disc extending axially from one side of said disc in radially outwardly opposed relation to said hub and presenting a generally cylindrical outer contour and a frusto-conical internal periphery, said rim having a radially inwardly offset portion providing an annular radial shoulder concentric with said hub, said rim having a plurality of circumferentially spaced radial perforations centered on said rim, and a tooth associated with each perforation and having a root end extending therethrough and having an integral head in complementary engagement with the internal periphery of said rim and having an outer flange forged into said shoulder and in complementary engagement therewith and contiguous with the outer contour of said rim for connecting the tooth to the rim and to prevent the tooth from turning.

2. The invention according to claim 1 and further characterized in that said shoulder is disposed in the region of the juncture of said rim with said disc.

3. The invention according to claim 1 and said disc disposed intermediate the ends of said hub and a plurality of radial ribs formed integral with the outer periphery of the hub and the side of said disc opposite to said one side thereof.

4. A fabricated rotary hoe comprising a core member including a hub with an axle bore therethrough, a radial disc integral with said hub, an integral rim about the outer periphery of said disc, said rim having a radially inwardly offset portion defining an annular radial shoulder concentric with said hub, said rim having a plurality of circumferentially spaced radial perforations adjacent to said shoulder, and a tooth associated with each perforation and having a root end extending therethrough and having an integral head in complementary engagement with the internal periphery of said rim and having an outer flange forged into said shoulder and in complementary engagement therewith and contiguous with the outer contour of said rim for connecting the tooth to the rim and to prevent the tooth from turning.

5. A fabricated rotary hoe comprising a center part and a rim about the center part and connected thereto, said rim having a radially offset portion defining radially extending shoulder means, said rim having a plurality of circumferentially spaced radial perforations adjacent to said shoulder means, teeth associated with said perforations and each having a root end extending through the related perforation and having an integral head in complementary engagement with the internal periphery of said rim and having an outer flange forged into said shoulder and in complementary engagement therewith and contiguous with the outer contour of said rim for connecting the tooth to the rim and to prevent the tooth from turning.

References Cited in the file of this patent

UNITED STATES PATENTS

| | | |
|---|---|---|
| 425,956 | Phelps | Apr. 15, 1890 |
| 2,028,365 | Wangelin | Jan. 21, 1936 |

FOREIGN PATENTS

| | | |
|---|---|---|
| 7,734 | Great Britain | 1884 |